United States Patent Office 2,909,539
Patented Oct. 20, 1959

2,909,539

A PROCESS FOR THE PREPARATION OF HIGH MOLECULAR WEIGHT CONDENSATION PRODUCTS

Carl B. Linn, Riverside, Ill., assignor, by mesne assignments, to Universal Oil Products Company, Des Plaines, Ill., a corporation of Delaware No Drawing. Application February 27, 1956
Serial No. 567,741

4 Claims. (Cl. 260—410.5)

This invention relates to high molecular weight compositions of matter and to a process for their preparation which comprises condensing an aliphatic acid and a diaryl-desoxy-saccharide. This process relates more particularly to the condensation of an aliphatic acid and a diaryl-desoxy-hexitol, said condensation being carried out in the presence of an acid-type catalyst at condensation conditions.

An object of this invention is to produce high molecular weight compositions of matter suitable for use per se or as intermediates in the manufacture of detergents, pharmaceuticals, surface coatings, resins, plasticizers, lubricating oil additives, etc.

One embodiment of this invention relates to a process which comprises condensing an aliphatic acid and a diaryl-desoxy-saccharide, said reaction being carried out at condensation conditions in the presence of an acid-type condensation catalyst.

Another embodiment of this invention relates to a process which comprises condensing an aliphatic acid and a diaryl-desoxy-saccharide, said condensation being carried out at condensation conditions in the presence of a condensation catalyst comprising hydrofluoric acid.

Still another embodiment of this invention relates to a process which comprises condensing a monobasic aliphatic acid and a diaryl-desoxy-hexitol, said condensation being carried out at condensation conditions in the presence of a condensation catalyst comprising hydrofluoric acid.

Another embodiment of this invention relates to a process which comprises condensing a monobasic saturated aliphatic acid and a diaryl-desoxy-glucitol, said condensation being carried out at condensation conditions in the presence of a condensation catalyst comprising hydrofluoric acid.

Still another embodiment of this invention relates to a process which comprises condensing a monobasic unsaturated aliphatic acid and a diaryl-desoxy-glucitol, said condensation being carried out at condensation conditions in the presence of a condensation catalyst comprising hydrofluoric acid.

A specific embodiment of this invention relates to a condensation process which comprises condensing oleic acid with 1,1-diphenyl-1-desoxy-glucitol at condensation conditions in the presence of a condensation catalyst comprising hydrofluoric acid.

Another specific embodiment of this invention relates to a process which comprises condensing oleic acid with 1,1-di-p-tolyl-1-desoxy-glucitol at condensation conditions in the presence of a condensation catalyst comprising hydrofluoric acid.

I have found that useful condensation products are formed by reacting aliphatic acids and diaryl-desoxy-saccharide in the presence of an acid-type condensation catalyst, and particularly in the presence of hydrofluoric acid. These condensations may be carried out in steel equipment or other suitable apparatus lined with inert materials such as silver, copper, stainless steel, and certain alloys such as Monel metal and the like. These condensations may be effected at temperatures of from about $-40°$ to about $150°$ C. and preferably at temperatures of from about $0°$ to about $50°$ C. While many of the condensation reactions are carried out at substantially atmospheric pressure, it may be desirable in certain instances and with certain reactants to carry out the condensation reactions at pressures up to 100 atmospheres or more. When utilizing pressure it is convenient in most instances to operate the equipment utilized at the autogenous pressure generated by the reaction mixture therein.

Aliphatic acids which may be used as starting materials in the process of this invention are monobasic and dibasic aliphatic acids such as monobasic saturated aliphatic acids, monobasic unsaturated aliphatic acids, aryl substituted monobasic fatty acids, dibasic saturated aliphatic acids, and dibasic unsaturated aliphatic acids. Typical utilizable monobasic saturated aliphatic acids include formic acid, acetic acid, propionic acid, butyric acid, valeric acid, caprilic acid, oenanthic acid, caproic acid, pelargonic acid, capric acid, undecylic acid, lauric acid, tridecylic acid, myristic acid, pentadecylic acid, palmitic acid, margaric acid, stearic acid, nonadecylic acid, etc. Typical utilizable unsaturated monobasic acids include those of the so-called oleic acid series such as acrylic acid, crotonic acid, and its isomer isocrotonic acid, vinyl acetic acid, angelic acid and its isomer tiglic acid, oleic acid and its isomer elaidic acid, erucic acid and its isomer brassidic acid, etc. Typical utilizable saturated dibasic aliphatic acids include oxalic acid, malonic acid, succinic acid, glutaric acid, adipic acid, pimelic acid, suberic acid, azelaic acid, sebacic acid, nonane dicarboxylic acid, undecane dicarboxylic acid, etc. Typical utilizable unsaturated dibasic acids include maleic and fumaric acid, citraconic acid, mesaconic acid, itaconic acid, etc.

The diaryl-desoxy-saccharides which are condensed with one or more of the above described aliphatic acids are produced by the reaction of a carbohydrate with an aromatic compound. Preferred diaryl-desoxy-saccharides are diaryl-desoxy-hexitols, and more particularly preferred starting materials in this process comprise 1,1-diaryl-1-desoxy-glucitols. As hereinabove stated, these diaryl-desoxy-saccharides are produced by the reaction of a carbohydrate with an aromatic compound in the presence of an acid-type catalyst. While hydrogen fluoride is the catalyst preferred for the preparation of most of these diaryl-desoxy-saccharide starting materials, they may also be produced in the presence of other acid-acting catalysts such as catalysts of the Friedel-Crafts type, particularly aluminum chloride, as such, or modified by the addition thereto of an alcohol, ether, ester, nitroparaffin, alkyl halide, and the like. Mixtures of boron trifluoride and hydrogen fluoride may also be employed. In some cases, fluoro acids may be employed in their preparation, including fluorosulfonic acid, fluorophosphoric acid, hydroxyfluoroboric acid, and the like. These preparations are readily carried out at a temperature of from about $-40°$ to about $150°$ C. and at substantially atmospheric pressure or higher.

Carbohydrates which are condensed with aromatic compounds in the preparation of diaryl-desoxy-saccharides include simple sugars, their desoxy- and omega-carboxy derivatives, compound sugars or oligosaccharides, and polysaccharides. Simple sugars include dioses, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid, polyuronides, polysaccharides composed of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glyceraldehyde, and s-dihydroxyacetone; tetroses, such as erythrose, threose, erythrulose, and apiose; the pentoses such as arabinose, xylose, ribose, lyxose, rhamnose (a desoxy hexose), fucose (a desoxy hexose), rhodeose, digitalose, and ketoxylose; the hexoses such as mannose, glucose, idose, gulose, galactose, talose, allose, altrose, fructose, sorbose, tagatose, and psicose; the heptoses such as glucoheptose, mannoheptose, galactoheptose, sedoheptose, mannoketoheptose; glucoheptulose, perseulose; octoses such as glucooctose, mannooctose, and galactooctose; nonoses such as glucononose, and mannononose; and decoses such as glucodecose. Desoxy derivatives of simple sugars are formed by the replacement of a hydroxyl substituent in a sugar with hydrogen, thereby forming a methyl or methylene linkage. The desoxy pentoses and desoxy hexoses are the most commonly occurring of such compounds. The omega-carboxy derivatives of simple sugars which are suitable in the process of the present invention include tartronic semialdehyde, or its tautomer, hydroxypyruvic acid, alpha, beta-dihydroxyacetoacetic acid, threuronic acid, 4-keto-2,3,5-trihydroxypentanoic acid, xyluronic acid, 5-ketohexanoic acids such as 5-keto-allonic acid, 5-keto-gluconic acid, 5-keto-mannonic acid, 5-keto-gulonic acid, and 5-keto-galacturonic acid, uronic acids such as glucouronic acid, and galacturonic acid, and the 6-keto-heptanoic acids.

The simple sugars and their omega-carboxy derivatives, as starting materials in the preparation of diaryldesoxysaccharides may be represented by the following general formula:

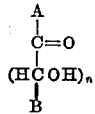

in which A=hydrogen, and CH$_2$OH, $n$=an integer of from 1 to about 12 or so, and B=H, CH$_2$OH, and COOH. As an example of the utility of this general formula when A=H, $n$=1, and B=H, the compound is glycolaldehyde; when A=H, $n$=1, and B=CH$_2$OH, the compound is glyceraldehyde; when A=H, $n$=1, and B=COOH, the compound is tartronic semialdehyde, a tautomer of hydroxypyruvic acid; when A=CH$_2$OH, $n$=1, and B=H, the compound is s-dihydroxyacetone; when A=CH$_2$OH, $n$=1, and B=CH$_2$OH, the compound is erythrulose; when A=CH$_2$OH, $n$=1, and B=COOH, the compound is alpha,beta-dihydroxy-acetoacetic acid; when A=H, $n$=2, and B=CH$_2$OH, the compound is erythrose, or threose; when A=H, $n$=2, and B=COOH, the compound is threuronic acid; when A=CH$_2$OH, $n$=2, and B=CH$_2$OH, the compound is riboketose, or xyloketose; when A=CH$_2$OH, $n$=2, and B=COOH, the compound is 4-keto-2,3,5-trihydroxy-pentanoic acid; when A=H, $n$=3, and B=CH$_2$OH, the compound is ribose, arabinose, xylose, or lyxose; when A=H, $n$=3, and B=COOH, the compound is xyluronic acid; when A=CH$_2$OH, $n$=3, and B=CH$_2$OH, the compound is psicose, fructose, sorbose, or tagatose; when A=CH$_2$OH, $n$=3, and B=COOH, the compound is 5-keto-2,3,4,6-tetrahydroxy-hexanoic acid; when A=H, $n$=4, and B=CH$_2$OH, the compound is allose, altrose, glucose, mannose, gulose, idose, galactose, or talose; when A=H, $n$=4, and B=COOH, the compound is a uronic acid; when A=CH$_2$OH, $n$=4, and B=CH$_2$OH, the compounds are heptoses; and when A=CH$_2$OH, $n$=4, and B=COOH, the compounds are 6-keto-2,3,4,5,7-pentahydroxy-heptanoic acids.

The utilizable oligosaccharides or compound sugars include disaccharides such as pentose-hexose saccharides including glucoapiose, vicianose, and primeverose; the methylpentose-hexose saccharides including glucorhamnoside and rutinose; the dihexoses such as turanose, maltose, lactose, cellobiose, gentiobiose, melibiose, sucrose, and trehalose. Other compound sugars are represented by the trisaccharides such as the methylpentose-hexose saccharides including rhamninose, and robinose; the trihexose saccharides such as mannotriose; and the trihexoses including raffinose, melezitose, and gentianose. An example of a suitable tetrasaccharide is stachyose.

Various polysaccharides are also utilizable in the preparation of the diaryl-desoxy-saccharides utilizable in the process of the present invention. Such polysaccharides are converted to monosaccharide units during the preparation of diaryl-desoxy-saccharides and include pentosans such as araban, methylpentosans such as fucosan, the hexosans such as starch, cellulose, glycogen, inulin, mannan, galactan, lichenin, levan, dextran, and laminarin. All of the above polysaccharides are composed of one type of sugar residue. Other polysaccharides which are composed of more than one type of sugar unit such as the pentosans, like araboxylan, and the hexosans like galactomannan may be used. Other utilizable polysaccharides are represented by those composed of uronic acid units such as pectic acid and alginic acid; those composed of aldose (pentose or hexose) and uronic acid units such as gum arabic, damson gum, gum tragacanth, linseed mucilage, and pectins, and those containing hexose units partially esterified with an inorganic acid such as seaweed polysaccharides like agar.

In preparing the diaryl-desoxy-saccharide starting materials utilized in the present process, a carbohydrate as hereinabove described is reacted with an aromatic compound. The aromatic compound may be selected from the mono-nuclear aromatic hydrocarbons, aromatic hydrocarbons containing one or more benzene rings, and in addition aromatic hydrocarbon derivatives such as phenols. Suitable utilizable aromatic hydrocarbons include benzene, toluene, o-xylene, m-xylene, p-xylene, ethylbenzene, 1,2,3-trimethylbenzene, 1,2,4-trimethylbenzene, 1,3,5-trimethylbenzene or mesitylene, o-ethyl-toluene, p-ethyltoluene, n- propylbenzene, isopropylbenzene, or cumene, etc. Higher molecular weight aromatic hydrocarbons are also suitable such as those produced by the alkylation of aromatic hydrocarbons with olefinic polymers. Such products are referred to in the art as alkylate, and include hexylbenzene, hexyltoluene, nonylbenzene, nonyltoluene, dodecylbenzene, dodecyltoluene, etc. Very often alkylate is obtained as a high boiling fraction in which case the alkyl group attached to the aromatic hydrocarbon varies in size from C$_9$ to C$_{18}$. Other suitable utilizable aromatic hydrocarbons include those containing an unsaturated side chain such as styrene, vinyl toluene, etc. Other suitable aromatic hydrocarbons include those with two or more alkyl groups such as diphenyl, diphenylmethane, triphenylmethane, fluorene, stilbene, etc. Examples of suitable utilizable hydrocarbons which contain condensed benzene rings include naphthalene, anthracene, phenanthrene, naphthacene, rubrene, etc. As stated hereinabove, certain hydroxy aromatic hydrocarbons may also be utilized in the preparation of the diaryl-desoxy-saccharide starting materials. Typical utilizable hydroxyaromatic compounds include phenol, o-cresol, m-cresol, p-cresol, guaiacol, o-hydroxydiphenyl, p-hydroxydiphenyl, catechol, resorcinol, hydroquinone, pyrogallol, hydroxy hydroquinone, etc. The above described reaction between a carbohydrate and an aromatic compound yields a diaryl-desoxy-saccharide starting material for the process of this application. Specific examples of such diaryl-desoxy-saccharides include 1,1-diphenyl-1-desoxy-glucitol, 1,1 - di-p-tolyl-1-desoxy-glucitol, 1,1-di(3,4-dimethylphenyl)-1-desoxy-glucitol, 1,1-di-(p-ethylphenyl)-1-desoxy-glucitol, 1,1-di-p-hydroxyphenyl - 1 - desoxy - glucitol, and 1,1-di-(2-hydroxy-3,5-dimethylphenyl) - 1 - desoxy - glucitol. The preparation of some of the above-mentioned specific diaryl-desoxy-hexitol utilizable in the process of this invention will be illustrated hereinafter in the examples.

The acid-type catalysts which are used in the process of this invention comprise preferably hydrogen fluoride. The hydrogen fluoride may be used in anhydrous form or it may be diluted with water to make hydrofluoric acid of the desired concentration. The hydrofluoric acid may also be further diluted with various inert diluents when it is desirable to operate the process of this invention with low hydrogen fluoride concentrations. Suitable inert diluents include perfluoro derivatives of n-paraffinic hydrocarbons such as perfluoropropane, perfluoro-n-butane, perfluoro-n-hexane, perfluoro-n-pentane, etc. Other suitable diluents are apparent to one skilled in the art. For example, cycloparaffins such as cyclopentane and cyclohexane may be used. In some instances, hydrofluoric acid of from about 85 to about 100% HF concentration is desirable and in some other instances it is most desirable to use anhydrous hydrogen fluoride as the catalyst.

This process may be carried out by slowly adding a hydrogen fluoride catalyst to a stirred mixture of aliphatic acid and diaryl-desoxy-saccharide while maintaining the condensation temperature at from about —40° to about 150° C. by suitable cooling and/or heating means. It is often desirable or advisable to commingle the reactants and catalyst at a relatively low temperature such as from about —80° to about —30° C. and then to permit the reaction mixture to warm gradually while the reactants and catalyst are stirred by suitable means such as a motor-driven stirrer or other adequate mixing equipment. After the reaction has reached the desired stage of completion, the hydrogen fluoride catalyst is removed from the reaction mixture by distillation at atmospheric or lower pressures, or by passing an inert gas through the reaction mixture while maintaining it at relatively low temperature. Also, the entire reaction mixture and catalyst may be mixed with water, or may be added to ice in order to quench the activity of the hydrogen fluoride catalyst and permit separation of the organic reaction products, in some instances, the unreacted starting materials from the catalyst. The organic reaction products may also be separated from aqueous hydrogen fluoride by means of an organic solvent such as ether, in which some of the organic material may be dissolved. Thus, the product formed by reacting 1,1-diphenyl-1-desoxy-glucitol with oleic acid in the presence of substantially anhydrous hydrogen fluoride at 0° C., separated into a water-soluble and a water-insoluble product which water-insoluble product is further separated into an acetone-soluble and an acetone-insoluble product.

The process of this invention broadly emphasizes the reaction of alphatic acids and diaryl-desoxy-saccharides using as a catalyst hydrogen fluoride in which process a type of product is markedly affected by the length of time that the reactants are in contact with the hydrogen fluoride catalyst as well as the temperature of the reaction and the mol ratios of the reactants utilized.

The reaction products of this process lead to materials having diversified uses. Some of these are enumerated as follows:

(a) DETERGENTS (1) *Sulfonate type.*—Sulfonation of some of the products leads to compounds of R—SO$_3$H type which can be converted into surface active salts.

(2) *Sulfate type.*—Sulfation of these products lead to compounds of the ROSO$_3$H type which, if desired, can be concerted into salts.

(3) *Non-ionic type.*—Some of the products are water-soluble to different degrees. Thus, for example, it is possible to make a series of surface active agents with increasing hydrophobic-hydrophilic ratio in the molecule by reacting the products with alkylene oxides.

(4) *Detergent aids.*—The structure of some of the products are related to compounds found useful as detergent aids (that is, compounds which when added to a detergent in small concentrations rather markedly increase their effectiveness). They may accordingly find use in that field.

(b) SURFACE COATINGS AND RESINS

Some of the reaction products can be used per se as surface coating materials. Resins can be made by heating many of the reaction products with formaldehyde, urea, phenol, aniline, etc., and combinations of the above-enumerated compounds.

(c) PLASTICIZERS

It is possible to balance the hydrophobic and hydrophilic parts of the molecule, going all the way from water-soluble hydrophilic materials to hydrophobic acting compounds, wherein the aromatic derivative part predominates over the oxygenated part, thus producing new plasticizing agents.

The nature of this invention is illustrated further by the following examples which, however, should not be construed to limit the generally broad scope of the invention.

*Example 1*

This example illustrates the reaction of 1,1-diphenyl-1-desoxy-glucitol with oleic acid in the presence of hydrogen fluoride as the catalyst, and in addition, illustrates the type of products obtained thereby.

The 1,1-diphenyl-1-desoxy-D-glucitol was prepared by the reaction of d-glucose and benzene as hereinafter described. The reaction was conducted in a glass alkylation apparatus equipped with a thermometer well, a mercury-sealed stirrer, and a water-cooled reflux condenser. To the above alkylation flask was charged 36 grams of d-glucose and 342 grams of benzene. To this mixture was added slowly 144 grams of anhydrous aluminum chloride during which addition the temperature of the reactants was maintained at about 10° C. Stirring was begun and the reaction temperature was raised to 50–80° C. and maintained within this range by means of an external water bath surrounding the alkylation flask. At the end of 8 hours' contacting time at the above temperature, the reaction mixture was hydrolyzed with ice-cold water, and any insoluble reaction product removed therefrom by filtration. The desired 1,1-diphenyl-1-desoxy-glucitol which is insoluble in cold water, and which was removed by the above-mentioned filtration was obtained in an amount of about 47 grams. Recrystallization of a portion of the 47 grams alcohol-soluble, water-insoluble product was carried out several times from boiling water. The pure 1,1-diphenyl-1-desoxy-glucitol obtained therefrom melts at 154.5–155.5° C. Elemental analysis corresponds with that calculated for this composition.

Into a steel autoclave provided with a mechanical driven stirrer was charged 25.5 grams of 1,1-diphenyl-1-desoxy-glucitol prepared in the above manner, and 23.6 grams of oleic acid. The mixture was cooled to about —80° C. and 193 grams of anhydrous hydrogen fluoride was pressured into the autoclave at this temperature. The temperature was allowed to rise to 0° C. at which temperature stirring was continued for one-half hour.

At the end of the reaction time a rapid stream of nitrogen was passed through the reaction mixture and out of the autoclave for about two hours. The exit gas mixture of hydrogen fluoride and nitrogen was vented to a hood. The autoclave was opened and the contents (47+ grams) were transferred to a silver dish and allowed to stand in a strong hood-draft for five days. The crude product after five days' exposure was a light, olive-green rubbery solid which adhered tenaciously to metallic surfaces.

The crude product was then boiled in water and yielded almost 47 grams of a tan product, soft and rubbery when warm, which product became hard and somewhat friable when dry and cold. Investigation of the aqueous wash showed no water-soluble organic product.

The product of the above treatment was found to be insoluble in ether, hydrocarbons, and halogenated hydrocarbons at 20° C. Five grams of this product dissolved slowly when boiled in 500 cc. of water along with one gram of sodium hydroxide. Hydrochloric acid reprecipitated five grams of a soft, amber resin which titrated to show an equivalent weight of 630 and which by elemental analysis was found to contain 74.50% carbon and 9.68% hydrogen.

Ten grams of the original 47 grams product recovered from the water extraction was extracted for 22 hours with acetone. There was obtained 6.8 grams of a soft amber resin and 2.9 grams of a friable solid. Three grams of the acetone-soluble product was boiled with 500 cc. of water with 1 gram of sodium hydroxide in which it dissolved in 1.5 hours. On reprecipitation with hydrochloric acid there was obtained 3.0 grams of a soft, amber resin of equivalent weight 1014. The carbon and hydrogen analysis for this acid was found to be 74.58% carbon and 9.67% hydrogen.

The acetone-insoluble solid (2.9 grams) was boiled with 500 cc. water containing 1.5 grams of sodium hydroxide for 18 hours during which time it slowly dissolved. On reprecipitation with hydrochloric acid, 2.7 grams of an amber resin having an equivalent weight of 610 was recovered. The elemental analysis of this recovered acid is 72.50% carbon and 9.86% hydrogen.

Extrapolation of the above data gives 132.3 grams of an acetone-soluble product, equivalent weight 1040 after caustic treatment, and 14.7 grams of an olive-green solid which after caustic treatment yielded an amber resin, equivalent weight 610.

It is postulated that one oleic acid molecule reacted for each 1,1-diphenyl-1-desoxy-glucitol, and since the product did not oxidize to terephthalic acid it is thought that the aromatic nucleus has at least three substituents. Since the product dissolves in caustic on heating, it is also postulated that the carboxyl groups are engaged in anhydride or ester linkages.

*Example II*

This example illustrates again the reaction of 1,1-diphenyl-1-desoxy-glucitol with oleic acid in the presence of hydrogen fluoride near 0° C. The reaction was carried out in a manner similar to that described in Example I. In this experiment, 46.8 grams of oleic acid was reacted with 25.8 grams of 1,1-diphenyl-1-desoxy-glucitol, prepared in a manner similar to that described in Example I, in the presence of 201 grams of hydrogen fluoride for a time of 1.5 hours at 0° C. It should be noted that the mol ratio of oleic acid to diaryl-desoxy-glucitol is 2:1 in this experiment in contrast to the 1:1 mol ratio utilized in the experiment described in Example I. From this reaction, 67.6 grams of crude product was isolated. The crude product was a light yellow cork-like resilient product. Treatment of the crude product with water indicated that no water-soluble component was present. The product was insoluble in hydrocarbons at 20° C. but soluble in dilute caustic from which a reprecipitated acid was recovered of the equivalent weight 412 and elemental analysis: 73.19% carbon and 10.90% hydrogen.

By Soxhlet extraction with acetone, the product consisted of 12.2 grams of amber viscous acetone-soluble liquid of equivalent weight 435 following caustic treatment, and 55.4 grams of tan cork-like acetone-insoluble solid of equivalent weight 482 following caustic treatment and reprecipitation with acid. It should be noted that the acetone-soluble and acetone-insoluble balance is almost the exact inverse of that described in Example I.

*Example III*

This examples illustrates again the reaction of oleic acid with 1,1-diphenyl-1-desoxy-glucitol in the presence of hydrogen fluoride near 0° C. The experiment was carried out in substantially the same manner as described in Example I. In this experiment 94.4 grams of oleic acid and 25 grams of 1,1-diphenyl-1-desoxy-glucitol were reacted in the presence of 188 grams of hydrogen fluoride for 1.5 hours at 0° C.

From the above reaction, 108 grams of crude product was obtained; this was a reddish-brown syrup from which was extracted with pentane 5 grams of a yellow oil, equivalent weight 484, and $n_D^{20}=1.4720$. The pentane-insoluble product was dissolved in ether, water-washed, filtered and evaporated. 103 grams of a sticky soft amber resin was isolated, this resin having an equivalent weight of 835 and containing 76.47% carbon and 11.27% hydrogen. This amber resin was soluble in hot caustic solution and the reprecipitated acid after such treatment had an equivalent weight of 534 and contained 75.23% carbon and 12.86% hydrogen.

*Example IV*

This example illustrates the reaction of 1,1-ditolyl-1-desoxy-glucitol with oleic acid in the presence of hydrogen fluoride near 0° C. The 1,1-di-p-tolyl-desoxy-glucitol can be prepared by reacting a carbohydrate containing a glucose unit with toluene in the presence of hydrogen fluoride. For example, an autoclave equipped with mechanical stirring is charged with 50 grams of cellulose and 172 grams of toluene. After closure, 231 grams of hydrogen fluoride is presured into the autoclave which has previously been cooled and maintained at −80° C. The temperature is allowed to rise to 0° C. and the reactants are contacted for 3 hours' time after which a rapid stream of nitrogen is passed through the autoclave for an hour or more to sweep out most of the hydrogen fluoride. After opening the autoclave and allowing the crude product to stand in a hood draft for 18 hours, 144 grams of crude product is obtained. From this product can be isolated a cold-water insoluble, ether-insoluble product comprising 1,1-di-p-tolyl-1-desoxy-glucitol, melting point 156° C.

23.6 grams of oleic acid was reacted with 27.7 grams of 1,1-p-tolyl-1-desoxy-glucitol in the presence of 198 grams of hydrogen fluoride for 15 hours at 0° C. This experiment was carried out in a similar manner to that described in Example I for the reaction of oleic acid with 1,1-diphenyl-1-desoxy-glucitol. In this reaction the mol ratio of oleic acid to 1,1-di-p-tolyl-1-desoxy-glucitol was 1:1.

From the reaction was isolated 40.1 grams of crude olive green friable solid. Leaching with water yielded no water-soluble component. This product was found to be insoluble in ether, hydrocarbons and chlorinated derivatives thereof at 20° C. and at boiling temperatures. The product adhered less tenaciously to metal surfaces than the corresponding product described in Example I. After leaching with water the product became hard and friable. The total product was soluble in caustic after prolonged heating from which a reprecipitated acid of equivalent weight 611 was obtained. By Soxhlet extraction with acetone the product was separated into 13.7 grams of an amber resin and 33.4 grams of olive green acetone insoluble solid. This latter product was brittle when cold, and somewhat rubbery when heated. Caustic treatment dissolved the acetone soluble product and reprecipitation with acid gave a light amber resin, equivalent weight 687. Caustic treatment converted the acetone insoluble product after reprecipitation with acid to an amber resin, equivalent weight 571.

*Example V*

This example again illustrates the reaction of oleic acid with 1,1-di-p-tolyl-1-desoxy-glucitol in the presence of hydrogen fluoride near 0° C. The experiment was carried out in substantially the same manner as described hereinabove. In this experiment 46.8 grams of oleic acid and 27.7 grams of 1,1-di-p-tolyl-1-desoxy-glucitol were reacted in the presence of 172 grams of hydrogen fluoride for 1.5 hours at 0° C. It should be noted that the mol ratio of oleic acid to 1,1-di-p-tolyl-1-desoxy-glucitol was 2:1 in this experiment.

From this experiment was recovered 71 grams of crude product. This crude product was a mixture of yellow and white solid with cork-like resiliency both before and after leaching with water. It appeared to be similar to the product hereinabove and described in Example II. Caustic treatment converted the water leached product after reprecipitation to a soft, amber resin, equivalent weight 448. By Soxhlet extraction with acetone, the water-leached product was separated into 3.8 grams of yellow, viscous acetone-soluble oil and 28.2 grams of yellow and white friable but still cork-like product. Caustic treatment converted the acetone-soluble product after reprecipitation with acid to an amber wax, equivalent weight 462. Caustic treatment converted the acetone-insoluble product after reprecipitation with acid to an amber resin of equivalent weight 480 containing 73.06% carbon and 12.77% hydrogen.

I claim as my invention:

1. A process which comprises condensing oleic acid and a 1,1-diphenyl-1-desoxy-glucitol at a temperature of from about −40° to about 150° C. in the presence of a hydrogen fluoride catalyst.

2. A process which comprises condensing oleic acid and 1,1-diphenyl-1-desoxy-glucitol at about 0° C. in the presence of a hydrogen fluoride catalyst.

3. A process which comprises condensing oleic acid and 1,1-di-p-tolyl-1-desoxy-glucitol at about 0° C. in the presence of a hydrogen fluoride catalyst.

4. A process which comprises condensing oleic acid with a compound selected from the group consisting of 1,1-diphenyl-1-desoxy-glucitol and 1,1-di-p-tolyl-1-desoxy-glucitol at about 0° C. in the presence of a hydrogen fluoride catalyst.

References Cited in the file of this patent

UNITED STATES PATENTS

| | | |
|---|---|---|
| 2,192,907 | Harris | Mar. 12, 1940 |
| 2,275,494 | Bennett | Mar. 10, 1942 |
| 2,460,803 | Bonner et al. | Feb. 8, 1949 |
| 2,472,276 | Bonner et al. | June 7, 1949 |
| 2,722,521 | Shaw et al. | Nov. 1, 1955 |

OTHER REFERENCES

Berkman: Catalysis, 1940, page 193.

Groggins: Unit Processes in Organic Synthesis, 1952, pages 607–608 and 833.